US011845845B2

(12) United States Patent
Ahlers et al.

(10) Patent No.: US 11,845,845 B2
(45) Date of Patent: Dec. 19, 2023

(54) FOAM MATERIAL PARTICLES BASED ON LONG-CHAIN POLYAMIDES

(71) Applicant: BASF SE, Ludwigshafen am Rhein (DE)

(72) Inventors: Juergen Ahlers, Ludwigshafen (DE); Dennis Jopp, Ludwigshafen (DE); Frank Reil, Ludwigshafen (DE); Peter Gutmann, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 418 days.

(21) Appl. No.: 17/260,841

(22) PCT Filed: Jul. 11, 2019

(86) PCT No.: PCT/EP2019/068716
§ 371 (c)(1),
(2) Date: Jan. 15, 2021

(87) PCT Pub. No.: WO2020/016102
PCT Pub. Date: Jan. 23, 2020

(65) Prior Publication Data
US 2021/0269614 A1    Sep. 2, 2021

(30) Foreign Application Priority Data

Jul. 18, 2018 (EP) .................................... 18184128

(51) Int. Cl.
| *C08J 9/18*  | (2006.01) |
| *C08G 69/14* | (2006.01) |
| *C08G 69/34* | (2006.01) |
| *C08J 9/30*  | (2006.01) |
| *C08J 9/12*  | (2006.01) |
| *C08J 9/228* | (2006.01) |

(52) U.S. Cl.
CPC .............. *C08J 9/18* (2013.01); *C08G 69/14* (2013.01); *C08G 69/34* (2013.01); *C08J 9/122* (2013.01); *C08J 9/228* (2013.01); *C08J 9/30* (2013.01); *C08G 2110/005* (2021.01); *C08G 2110/0058* (2021.01); *C08G 2110/0066* (2021.01); *C08J 2201/03* (2013.01); *C08J 2203/06* (2013.01); *C08J 2203/182* (2013.01); *C08J 2377/02* (2013.01); *C08J 2377/08* (2013.01)

(58) Field of Classification Search
CPC .. C08G 69/14; C08G 36/34; C08G 2110/005; C08G 2110/0058; C08G 2110/0066; C08G 69/36
See application file for complete search history.

(56) References Cited

U.S. PATENT DOCUMENTS

| 5,013,518 A * | 5/1991 | Nielinger ............... C08G 69/34 |
| | | 264/331.19 |
| 2007/0036967 A1 | 2/2007 | Estur et al. |
| 2011/0294910 A1* | 12/2011 | Kriha ..................... B29B 9/065 |
| | | 521/59 |
| 2016/0121524 A1 | 5/2016 | Däschlein et al. |

FOREIGN PATENT DOCUMENTS

| CN | 1302826 A   | * | 7/2001 |
| CN | 101044196 A |   | 9/2007 |
| JP | H03197563   | * | 8/1991 |
| JP | H07179645 A |   | 7/1995 |
| WO | 2011134996 A1 | | 11/2011 |
| WO | 2014198779 A1 | | 12/2014 |
| WO | 2016030333 A1 | | 3/2016 |
| WO | 2017013510 A1 | | 1/2017 |
| WO | 2018050487 A1 | | 3/2018 |

OTHER PUBLICATIONS

International Search Report for corresponding PCT/EP2019/068716 dated Sep. 10, 2019, 3 Pages.
Database WPI Week 199537, Thomson Scientific, London, GB, AN 1995-281020 XP002784963, Jul. 18, 1995, 2 pages.
European Search Report for EP Patent Application No. 18184128.9, dated Oct. 9, 2018, 3 pages.

\* cited by examiner

*Primary Examiner* — K. Boyle
(74) *Attorney, Agent, or Firm* — Armstrong Teasdale LLP

(57) ABSTRACT

Foam particles that have a bulk density below 300 kg/m³ and are based on polyamides, including 85% to 100% by weight of at least one copolyamide obtainable by polymerizing the following components:
  (A) 15% to 84% by weight of at least one lactam,
  (B) 16% to 85% by weight of a monomer mixture (M) including the following components:
    (B1) at least one $C_{32}$-$C_{40}$ dimer acid and
    (B2) at least one $C_4$-$C_{12}$ diamine,
    wherein the monomer mixture (M) includes in the range from 45 to 55 mol % of component (B1) and in the range from 45 to 55 mol % of component (B2), based on the total molar amount of the monomer mixture (M), and the sum total of the components of (A) and (B) is 100% by weight, and processes for production thereof.

14 Claims, No Drawings

FOAM MATERIAL PARTICLES BASED ON LONG-CHAIN POLYAMIDES

CROSS-REFERENCE TO RELATED APPLICATIONS

This application is a U.S. National Phase Application of International Patent Application No. PCT/EP2019/068716, filed Jul. 11, 2019, which claims the benefit of priority to European Patent Application No. 18184128.9, filed Jul. 18, 2018, the entire contents of each of which are hereby incorporated by reference herein.

DESCRIPTION

The invention relates to foam particles based on polyamides, comprising 85% to 100% by weight of at least one long chain copolyamide, and to processes for production thereof.

WO 2011/134996 describes expandable polyamide-based pellets that can be foamed in a prefoamer to give expanded polyamides and are suitable for production of a particle foam for use in the automotive industry, aviation industry, building industry, packaging industry, sports and leisure industry, in transport and/or in construction.

US 2007/036967 describes, inter alia, rigid expanded polyamide pellets having a density of 600 kg/m$^3$ that are said to be obtained by extrusion of a mixture of nylon-6 pellets and polycarbonate pellets in a twin screw extruder, with subsequent underwater pelletization.

JP7179645 describes cylindrical high-density polyamide foam particles that are obtained by melt extrusion of a polyamide containing 1-5 parts by weight of water, followed by strand pelletization.

WO 2014/198779 describes a process for producing expanded pellets from a thermoplastic elastomer having elongation at break of more than 100% measured to DIN EN ISO 527-2, comprising the steps of: (a) pressing the polymer melt comprising a blowing agent through a perforated disk controlled to a temperature between 150° C. and 280° C. and into a pelletizing chamber, b) using a cutting device to comminute the polymer melt pressed through the perforated disk into individual expanding pellets, c) discharging the pellets from the pelletizing chamber using a liquid stream, wherein the blowing agent comprises $CO_2$ or $N_2$ or a combination of $CO_2$ and $N_2$ and the amount of blowing agent in the polymer melt comprising blowing agent is in the range from 0.5% to 2% by weight, and wherein the pelletizing chamber is traversed by a stream of liquid which is controlled to a temperature between 150° C. and 280° C. and the pressure of which is from 0.1 bar to 20 bar above ambient pressure, the pressure and temperature for the liquid in the pelletizing chamber and also the temperature for the perforated disk being chosen such that the pellets are expanded in the pressurized liquid by the blowing agent they contain so as to produce expanded pellets having an uninterrupted skin. One thermoplastic elastomer used is a polyether copolyamide (PEBA).

WO 2017/013510 describes foamed materials having improved solvent resistance and a density of 40 to 700 kg/m$^3$, formed from 50-90% by weight of semicrystalline polymer and 10-50% by weight of a polyphenylene ether. Semicrystalline polymers used may be polyamides, polyesters and polyolefins. The foams may be obtained by impregnating the polymer melt with a blowing agent in the extruder.

WO 2016/030333 describes, inter alia, the production of expanded particles based on polyether-block-amides (PEBA) and nylon-12 by extrusion and impregnation of a polymer melt with $CO_2$, followed by underwater pelletization. The amorphous fractions are increased by adding a chain extender, for example a styrene acrylate with reactive epoxy groups.

WO 2018/050487 describes a polymer film comprising at least one copolyamide, wherein the copolyamide has been prepared by polymerizing 15% to 84% by weight of at least one lactam and 16% to 85% by weight of a monomer mixture comprising at least one $C_{32}$-$C_{40}$ dimer acid and at least one $C_4$-$C_{12}$ diamine.

Owing to their high chemical stability, thermal stability and stress cracking resistance, semicrystalline polymers such as polyamides or polyesters are of interest for particle foams. In the case of semicrystalline polymers, however, the processing window for foaming to give foams having homogeneous foam structure and mechanical properties is too small. The addition of additives such as chain extenders and/or crosslinkers can have an adverse effect on the mechanical properties. The addition of fillers to regulate melt viscosity generally leads to high densities and to embrittlement of the foams.

It was therefore an object of the present invention to provide foam particles based on polyamides and processes for production thereof, which are especially processible even without additives, especially without chain extenders or high proportions of fillers, to give foams having low density and good mechanical properties.

The object was achieved by foam particles that have a bulk density below 300 kg/m$^3$ and are based on polyamides, comprising 85% to 100% by weight of at least one copolyamide obtainable by polymerizing the following components:

(A) 15% to 84% by weight of at least one lactam,
(B) 16% to 85% by weight of a monomer mixture (M) comprising the following components:
   (B1) at least one $C_{32}$-$C_{40}$ dimer acid and
   (B2) at least one $C_4$-$C_{12}$ diamine, wherein the monomer mixture (M) comprises in the range from 45 to 55 mol % of component
   (B1) and in the range from 45 to 55 mol % of component (B2), based on the total molar amount of the monomer mixture (M), and the sum total of the components of (A) and (B) is 100% by weight.

Preferably, the foam particles consist of 85% to 100% by weight of the copolyamide described hereinafter and 0% to 15% by weight of additives, such as nucleating agents, dyes, pigments, fillers, flame retardants, flame retardant synergists, antistats, stabilizers (for example hydrolysis stabilizers), surface-active substances, plasticizers and infrared opacifiers.

More preferably, the foam particles consist of 98% to 99.9% by weight of the copolyamide described hereinafter and 0.1% to 2% by weight of a nucleating agent, especially talc.

The foam particles have a bulk density below 300 kg/m$^3$ preferably in the range from 30 to 250 kg/m$^3$, more preferably in the range from 40 to 200 kg/m$^3$ and most preferably in the range from 80 to 150 kg/m$^3$.

Copolyamide

According to the invention, the copolyamide is prepared by polymerizing the following components:
(A) 15% to 84% by weight of at least one lactam,
(B) 16% to 85% by weight of a monomer mixture (M) comprising the following components:

(B1) at least one $C_{32}$-$C_{40}$ dimer acid and
(B2) at least one $C_4$-$C_{12}$ diamine,
wherein the monomer mixture (M) comprises in the range from 45 to 55 mol % of component (B1) and in the range from 45 to 55 mol % of component (B2), based on the total molar amount of the monomer mixture (M), and the sum total of the components of (A) and (B) is 100% by weight.

The copolyamide has preferably been prepared by polymerizing from 40% to 83% by weight of component (A) and 17% to 60% by weight of component (B), more preferably from 60% to 80% by weight of component (A) and 20% to 40% by weight of component (B), where the sum total of components (A) and (B) is 100% by weight.

The polymerization of components (A) and (B) can take place in the presence of a catalyst. Preferred catalysts are phosphorus compounds, for example sodium hypophosphite, phosphorous acid, triphenylphosphine or triphenyl phosphite.

The polymerization of components (A) and (B) forms the copolyamide, which therefore comprises structural units derived from component (A) and structural units derived from component (B). Structural units derived from component (B) comprise structural units derived from components (B1) and (B2) and, optionally, from component (B3).

The copolyamide is preferably a random copolymer.

In general, the copolyamide has a glass transition temperature ($T_g$) in the range from 20 to 50° C., preferably in the range from 23 to 47° C. and especially preferably in the range from 25 to 45° C., determined to ISO 11357-2:2014.

In general, the copolyamide has a melting temperature in the range from 150 to 210° C., preferably in the range from 160 to 205° C. and especially preferably in the range from 160 to 200° C., determined to ISO 11357-2:2014.

The copolyamide generally has a viscosity number (VN) in the range from 150 to 300 ml/g, preferably in the range from 160 to 290 ml/g and more preferably in the range from 170 to 280 ml/g, determined in a 0.5% by weight solution of the copolyamide in a mixture of phenol/o-dichlorobenzene in a weight ratio of 1:1.

Component (A)

According to the invention, component (A) is at least one lactam. In the context of the present invention, "lactams" are understood to mean cyclic amides having preferably 4 to 12 carbon atoms, more preferably 5 to 8 carbon atoms, in the ring.

Suitable lactams are for example selected from the group consisting of 3-aminopropanolactam (propio-3-lactam; β-lactam; β-propiolactam), 4-aminobutanolactam (butyro-4-lactam; γ-lactam; butyrolactam), aminopentanolactam (2-piperidinone; δ-lactam; δ-valerolactam), 6-aminohexanolactam (hexano-6-lactam; ε-lactam; ε-caprolactam), 7-aminoheptanolactam (heptano-7-lactam; ζ-lactam; ζ-heptanolactam), 8-aminooctanolactam (octano-8-lactam; η-lactam; η-octanolactam), 9-aminononanolactam (nonano-9-lactam; θ-lactam; θ-nonanolactam), 10-aminodecanolactam (decano-10-lactam; ω-decanolactam), 11-aminoundecanolactam (undecano-11-lactam; ω-undecanolactam) and 12-aminododecanolactam (dodecano-12-lactam; ω-dodecanolactam).

The lactams may be unsubstituted or at least monosubstituted. If at least monosubstituted lactams are used, the nitrogen atom and/or the ring carbon atoms thereof may bear one, two, or more substituents selected independently of one another from the group consisting of $C_1$- to $C_{10}$-alkyl, $C_5$- to $C_6$-cycloalkyl, and $C_5$- to $C_{10}$-aryl.

Suitable $C_1$- to $C_{10}$-alkyl substituents are, for example, methyl, ethyl, propyl, isopropyl, n-butyl, sec-butyl, and tert-butyl. A suitable $C_5$- to $C_6$-cycloalkyl substituent is for example cyclohexyl. Preferred $C_5$- to $C_{10}$-aryl substituents are phenyl or anthranyl.

It is preferable to employ unsubstituted lactams, γ-lactam (γ-butyrolactam), δ-lactam (δ-valerolactam) and ε-lactam (ε-caprolactam) being preferred. Particular preference is given to δ-lactam (δ-valerolactam) and ε-lactam (ε-caprolactam), ε-caprolactam being especially preferred.

Monomer Mixture (M)

According to the invention, component (B) is a monomer mixture (M). The monomer mixture (M) comprises components (B1), at least one $C_{32}$-$C_{40}$ dimer acid, and (B2), at least one $C_4$-$C_{12}$ diamine.

The monomer mixture (M) comprises in the range from 45 to 55 mol % of component (B1) and in the range from 45 to 55 mol % of component (B2), preferably in the range from 47 to 53 mol % of component (B1) and in the range from 47 to 53 mol % of component (B2), more preferably in the range from 49 to 51 mol % of component (B1) and in the range from 49 to 51 mol % of component (B2), based on the total molar amount of the monomer mixture (M).

Component (B) may additionally comprise a component (B3), at least one $C_4$-$C_{20}$ diacid.

When component (B) additionally comprises component (B3), it is preferable that component (B) comprises in the range from 45 to 54.9 mol % of component (B1), in the range from 45 to 55 mol % of component (B2) and in the range from 0.1 to 10 mol % of component (B3), based in each case on the total molar amount of component (B).

When component (B) additionally comprises component (B3), the molar percentages of components (B1), (B2) and (B3) typically add up to 100 mol %.

The monomer mixture (M) may further comprise water.

Component (B1)

According to the invention, component (B1) is at least one $C_{32}$-$C_{40}$ dimer acid. In the context of the present invention, "at least one $C_{32}$-$C_{40}$ dimer acid" means either exactly one $C_{32}$-$C_{40}$ dimer acid or a mixture of two or more $C_{32}$-$C_{40}$ dimer acids. $C_{32}$-$C_{40}$ dimer acids can be obtained, for example, by dimerizing unsaturated fatty acids, for example unsaturated $C_{16}$ fatty acids, unsaturated $C_{18}$ fatty acids and unsaturated $C_{20}$ fatty acids.

Component (B1) is especially preferably at least one $C_{36}$ dimer acid. The $C_{36}$ dimer acid is preferably prepared proceeding from unsaturated $C_{18}$ fatty acids. The $C_{36}$ dimer acid is more preferably prepared proceeding from $C_{18}$ fatty acids selected from the group consisting of petroselic acid ((6Z)-octadeca-6-enoic acid), oleic acid ((9Z)-octadeca-9-enoic acid), elaidic acid ((9E)octadeca-9-enoic acid), vaccenic acid ((11E)-octadeca-11-enoic acid) and linoleic acid ((9Z,12Z)-octadeca-9,12-dienoic acid). The preparation of component (B1) from unsaturated fatty acids can additionally form trimer acids; residues of unreacted unsaturated fatty acid may also remain.

Preferably in accordance with the invention, component (B1) comprises at most 0.5% by weight of unreacted unsaturated fatty acid and at most 0.5% by weight of trimer acid, more preferably at most 0.2% by weight of unreacted unsaturated fatty acid and at most 0.2% by weight of trimer acid, based in each case on the total weight of component (B1).

The dimer acids to be used are obtainable as commercial products. Examples include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Croda, Empol 1008, Empol 1012, Empol 1061, and Empol 1062 from BASF SE, and Unidyme 10 and Unidyme TI from Arizona Chemical.

Component (B1) generally has an acid number in the range from 190 to 200 mg KOH/g.

Component (B2)

According to the invention, component (B2) is at least one $C_4$-$C_{12}$ diamine. In the context of the present invention, "at least one $C_4$-$C_{12}$ diamine" means either exactly one $C_4$-$C_{12}$ diamine or a mixture of two or more $C_4$-$C_{12}$ diamines.

Examples of suitable components (B2) are selected from the group consisting of 1,4-diaminobutane (butane-1,4-diamine; tetramethylenediamine; putrescine), 1,5-diaminopentane (pentamethylenediamine; pentane-1,5-diamine; cadaverine), 1,6-diaminohexane (hexamethylenediamine; hexane-1,6-diamine), 1,7-diaminoheptane, 1,8-diaminooctane, 1,9-diaminononane, 1,10-diaminodecane (decamethylenediamine), 1,11-diaminoundecane (undecamethylenediamine) and 1,12-diaminododecane (dodecamethylenediamine).

Preferably, component (B2) is selected from the group consisting of tetramethylenediamine, pentamethylenediamine, hexamethylenediamine, decamethylenediamine and dodecamethylenediamine.

Component (B3)

According to the invention, any component (B3) present in component (B) is at least one $C_4$-$C_{20}$ diacid. In the context of the present invention, "at least one $C_4$-$C_{20}$ diacid" means either exactly one $C_4$-$C_{20}$ diacid or a mixture of two or more $C_4$-$C_{20}$ diacids.

Examples of suitable components (B3) are selected from the group consisting of butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, tridecanedioic acid, tetradecanedioic acid and hexadecanedioic acid.

Preferably, component (B3) is selected from the group consisting of pentanedioic acid (glutaric acid), hexanedioic acid (adipic acid), decanedioic acid (sebacic acid) and dodecanedioic acid.

The invention also provides a process for producing foam particles according to any of claims 1 to 6, comprising the stages of:
(a) providing a polymer or polymer mixture comprising 85% to 100% by weight of at least one copolyamide, obtainable by polymerizing the following components:
  (A) 15% to 84% by weight of at least one lactam,
  (B) 16% to 85% by weight of a monomer mixture (M) comprising the following components:
    (B1) at least one $C_{32}$-$C_{40}$ dimer acid and
    (B2) at least one $C_4$-$C_{12}$ diamine,
    (B) optionally at least one $C_4$-$C_{20}$ diacid,
  wherein the monomer mixture (M) comprises in the range from 45 to 55 mol % of component (B1) and in the range from 45 to 55 mol % of component (B2), based on the total molar amount of the monomer mixture (M), and the sum total of the components of (A) and (B) is 100% by weight;
(b) impregnating the polymer or polymer mixture with carbon dioxide, nitrogen or mixtures thereof as blowing agent; and
(c) expanding the blowing agent-containing polymer or polymer mixture under foaming to give foam particles.

In one possible process variant, in stage (b), pellets of the polymer or polymer mixture are impregnated with gaseous carbon dioxide, nitrogen or mixtures thereof in an autoclave at a pressure in the range of 18 to 25 MPa at a temperature in the range from 180 to 250° C. for 1 to 5 hours.

In an alternative process variant, in stage (b), the polymer or polymer mixture is melted and the polymer melt is impregnated with carbon dioxide, nitrogen or mixtures thereof.

A preferred process comprises the steps of:
(a) providing a polymer or polymer mixture comprising 85% to 100% by weight of at least one copolyamide, obtainable by polymerizing the following components:
  (A) 15% to 84% by weight of at least one lactam,
  (B) 16% to 85% by weight of a monomer mixture (M) comprising the following components:
    (B1) at least one $C_{32}$-$C_{40}$ dimer acid and
    (B2) at least one $C_4$-$C_{12}$ diamine,
    (B) optionally at least one $C_4$-$C_{20}$ diacid,
  wherein the monomer mixture (M) comprises in the range from 45 to 55 mol % of component (B1) and in the range from 45 to 55 mol % of component (B2), based on the total molar amount of the monomer mixture (M), and the sum total of the components of (A) and (B) is 100% by weight;
(b) melting the polymer or polymer mixture together with 0% to 1% by weight, preferably 0.1% to 0.7% by weight, of a nucleating agent and impregnating by addition of 1% to 3.5% by weight, preferably 1.5-2.5% by weight, of carbon dioxide, nitrogen or mixtures thereof as blowing agent, based in each case on the polymer or polymer mixture; and
(c) extruding the blowing agent-containing polymer melt through a perforated plate at a temperature between 200° C. and 280° C. into a pelletizing chamber; and
(d) discharging the expanded foam particles from the pelletizing chamber, wherein water at a temperature of 5 to 90° C. flows through the pelletizing chamber at a pressure of 0.1 bar to 20 bar above ambient pressure.

It has been found that, surprisingly, the lowest bulk densities are not obtained as expected in the case of maximum amounts of blowing agent, but that an amount of blowing agent of not 30 more than 3.5% by weight, preferably of not more than 2.5% by weight and especially of not more than 2% by weight leads to a particularly low bulk density. In the case of an amount of blowing agent of less than 1% by weight, there is likewise a rise in bulk density. The respective proportions by mass are based here on the total mass of the polymer melt with blowing agent present therein.

The optimal amount of blowing agent to be used depends on the thermoplastic polymer used and on the composition of the blowing agent, and is generally between 1% and 3.5% by weight. More preferably, a blowing agent mixture of carbon dioxide and nitrogen is used in amounts in the range from 1% to 3.5% by weight, preferably 1.5-2.5% by weight, based on the polymer or polymer mixture.

The copolyamide used in the aforementioned processes preferably has a water content in the range from 0.05% to 1.0% by weight. The water content of the polyamide used can be determined to DIN EN ISO 15512:2017-03. If the water content is about 1% by weight, the copolyamide should be predried.

In the process of the invention, it is possible to add further additives to the polymers or polymer mixture, such as dyes, pigments, fillers, flame retardants, flame retardant synergists, antistats, stabilizers (for example hydrolysis stabilizers), surface-active substances, plasticizers and infrared opacifiers, in customary amounts.

Suitable infrared opacifiers for reducing the radiative contribution to thermal conductivity are, for example, metal oxides, nonmetal oxides, metal powders, for example aluminum powders, carbon, for example carbon black, graphite or diamond, organic dyes and dye pigments. The use of infrared opacifiers is advantageous particularly for applications at high temperatures. Particularly preferred infrared opacifiers are carbon black, titanium dioxide, iron oxides or zirconium dioxide. The abovementioned materials can be used either individually or else in combination, i.e. in the form of a mixture composed of a plurality of materials. When fillers are used, these may be inorganic and/or organic.

When fillers are present, these are, for example, organic and inorganic powders or fibrous materials and mixtures thereof. Organic fillers used may, for example, be wood flour, starch, flax fibers, hemp fibers, ramie fibers, jute fibers, sisal fibers, cotton fibers, cellulose fibers or aramid fibers. Examples of suitable inorganic fillers include silicates, barytes, glass beads, zeolites, metals and metal oxides. Particular preference is given to using pulverulent inorganic substances such as chalk, kaolin, aluminum hydroxide, magnesium hydroxide, aluminum nitrite, aluminum silicate, barium sulfate, calcium carbonate, calcium sulfate, silica, quartz flour, aerosil, alumina, mica or wollastonite, or inorganic substances in the form of beads or fibers, for example iron powder, glass beads, glass fibers or carbon fibers. The average particle diameters or, in the case of fibrous fillers, the length of the fibers should be in the region of the cell size or less. Preference is given to an average particle diameter or an average length of the fibers in the range from 0.1 to 100 µm, especially in the range from 1 to 50 µm.

Suitable flame retardants are, for example, tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl) ethylenediphosphate. Apart from the halogen-substituted phosphates already mentioned, it is also possible to use inorganic flame retardants in the form of red phosphorus, aluminum oxide hydrate, antimony trioxide, arsenic trioxide, ammonium polyphosphate and calcium sulfate, or cyanuric acid derivatives, for example melamine or mixtures of at least two flame retardants, for example ammonium phosphate and melamine, and optionally starch and/or expandable graphite, in order to render the foamed thermoplastic polymers produced flame-retardant. In general, it has been found to be appropriate to use 0% to 50% by weight, preferably 5% to 25% by weight, of the flame retardants or flame retardant mixtures, based on the total weight of the blowing agent-containing system.

Prior to the injection of the polymer melt into the pelletizing chamber, it is mixed with the $CO_2$ blowing agent or a mixture of $CO_2$ and $N_2$. In addition, it is possible to add a co-blowing agent to the polymer melt. Co-blowing agents used may be alkanes such as ethane, propane, butane, pentane, alcohols such as ethanol, isopropanol, halogenated hydrocarbons or HCFCs, or a mixture thereof. The sole use of $CO_2$ or of a mixture of $CO_2$ and $N_2$ as blowing agent is particularly advantageous since these are inert gases that are noncombustible, such that no atmospheres that present an explosion hazard can arise in production. This obviates any need for costly safety precautions and greatly reduces the risk potential in the production. It is likewise advantageous that no storage period is required for the products on account of the vaporization of volatile combustible substances.

Further advantages arise when one or more nucleating agents are additionally added to the blowing agent-containing polymer melt. Suitable nucleating agents are especially talc, calcium fluoride, sodium phenylphosphinate and finely divided polytetrafluoroethylene, each individually or else in any desired mixture. The nucleating agent is more preferably talc. The proportion of nucleating agent based on the total mass of the polymer melt is preferably 0.1% to 2% by weight, especially 0.2% to 0.8% by weight.

The increase in the water pressure generally leads to lower bulk densities and to a more homogeneous product having narrower particle size distribution.

After leaving the perforated plate, the blowing agent present in the pellets expands and is contacted with a suitable liquid coolant, generally water or an aqueous mixture, so as to obtain expanded foam particles suspended in water or an aqueous mixture.

The expanded foam particles may be separated from the water stream in the customary manner, for example by filtering, for example with a mesh screen or curved screen, or typically by means of a continuous centrifuge.

The expanded foam particles obtained after step (d) typically have a bulk density of 5 to 300 kg/m$^3$, preferably of 30 to 200 kg/m$^3$ and more preferably of 40 to 150 kg/m$^3$.

The expanded foam particles are generally at least approximately spherical. The diameter depends on the chosen particle weight of the starting pellets and on the bulk density produced. But the foam particles typically have a diameter of 1 to 30 mm, preferably 3.5 to 25 mm and especially 4.5 to 20 mm.

In the case of non-spherical, e.g. elongate, cylindrical or ellipsoidal, foam particles, diameter means the longest dimension.

The foam particles may have been provided with an antistat. In a preferred embodiment, this is accomplished by coating.

The expanded foam particles produced in accordance with the invention can be used to produce shaped bodies (foams) foamed by methods known to the person skilled in the art.

For example, the expanded foam particles can be bonded to one another in a continuous or batchwise method with the aid of an adhesive, for example with polyurethane or epoxy adhesives known from the literature.

Preferably, the foam particles of the invention are thermally welded to one another in a closed mold. For this purpose, the foam particles are introduced into the mold and temperature is introduced after the mold has been closed, which results in welding of the foam particles to one another to form the foam, preferably having a density in the range from 5 to 300 kg/m$^3$. The foams may be semifinished products, for example slabs, profiles or sheets, or finished shaped articles having simple or complicated geometry. Accordingly, the term "foam" also includes semifinished foam products and foam moldings.

In a very particularly preferred embodiment, the moldings are welded by the "VARIOTHERM" process known to the person skilled in the art. This involves compressing the expanded particles in a mold and then heating up the walls of the mold using a heating medium and holding it at the desired temperature until the particles have become welded to one another. Subsequently, a cooling medium is passed through the walls of the mold, which enables rapid cooling of the welded particles in order to prevent collapse and enable removal of the finished component.

We have now found that moldings made from expanded foam particles based on PA6.6.36 are surprisingly hard.

These moldings accordingly show good tensile and compressive strengths, sufficiently low compression set and acceptable thermal stability, such that they are usable for corresponding applications in the sports and leisure sector, for example as frames for tennis rackets, core materials for skis or snowboards, watersports equipment, golf clubs, bicycle frames, toys, model construction, in the packaging or automotive industry, and for industrial applications. These moldings are especially suitable as core materials of composites, as insulation material in automobile construction, for example for battery insulation. The shaped bodies are also suitable as core material for sandwich constructions in shipbuilding, aerospace construction, wind turbine construction, and rail and road vehicle construction. They may serve, for example, for production of motor vehicle parts, such as trunk bases, parcel shelves, bodywork reinforcements, crash pads and side door trims.

The invention therefore also provides for the use of the foam particles of the invention for production of foam moldings for the automotive industry, wind power industry, building industry, packaging industry, sports and leisure industry, in transport and/or in construction.

EXAMPLES

Raw Materials Used:
PA6.6/36 Ultramid RX2240, high-viscosity copolyamide from BASF SE, melting point 199° C. to ISO 3146, density to ISO 1183 of 1.1 g/cm3
PA6 Ultramid® B27, nylon-6 from BASF SE
Talc IT Extra microscale talc, Mondo Minerals
Test Methods:
Bulk density was determined in accordance with DIN ISO 697:1984-01 by filling a 500 ml vessel with the expanded particles and determining the weight by means of a balance.

The water content of the polyamide used was determined to DIN EN ISO 15512:2017-03.

Example 1: Melt Extrusion 99.5 parts by weight of PA6.6/36 polyamide having a water content of 0.134% by weight was melted in a twin-screw extruder (screw diameter 18 mm, length/diameter (L/D) ratio=40) at 250° C. and mixed with 0.5 part by weight of talc. Subsequently, $CO_2$ or a mixture of $CO_2/N_2$ as blowing agent was metered into the melt, mixed homogeneously and extruded through a perforated plate (hole diameter 1 mm). The perforated plate was electrically heated by means of heating cartridges and kept at a temperature of 280° C. or 240° C. The extruded strand was pelletized by underwater pelletization (UWP) at a pressure of 1 MPa to give foam particles having an average diameter of 2 mm and an average weight of 2 mg by means of 10 blades secured to a rotating blade ring.

The amounts of the blowing agent added to the polymer melt (based on 100 parts polyamide/talc melt), the temperature of the blowing agent-laden melt and of the perforated plate, and the bulk density of the resulting foam particles are collated in table 1.

TABLE 1

| Example | $CO_2$ [% by wt.] | $N_2$ [% by wt.] | Temperature [C] of the melt before the perforated plate | Temperature [C] of the perforated plate | Bulk density [kg/m³] |
|---|---|---|---|---|---|
| 1.1 | 1.96 | — | 251 | 280 | 348 |
| 1.2 | 1.96 | 0.29 | 251 | 280 | 170 |
| 1.3 | 1.96 | 0.29 | 222 | 240 | 170 |
| 1.4 | 2.90 | 0.29 | 223 | 240 | 124 |

Example 2 and Comparative Experiments: Autoclave Method

20 PA6.6/36 pellets were introduced into a conventional stainless steel tea strainer and placed in a high-pressure autoclave. The autoclave was closed, $CO_2$ or $N_2$ was injected at a pressure MPa, and impregnation was effected at a temperature in the range from 180 to 235° C. for 3 hours. Subsequently, the autoclave was decompressed abruptly by opening a ball valve. After the autoclave had been cooled to room temperature, the foamed polyamide particles were removed.

The impregnation conditions and foaming characteristics are collated in table 2.

TABLE 2

| Example | Polyamide | Impregnation medium | Impregnation temperature [C.] | Foaming characteristics | Bulk density [kg/m³] |
|---|---|---|---|---|---|
| 2.1 | PA6/6.36 | $CO_2$ | 180 | Not foamed | 1100 |
| 2.2 | PA6/6.36 | $CO_2$ | 205 | Well foamed | 200 |
| 2.3 | PA6/6.36 | $CO_2$ | 210 | Overfoamed, many cavities | — |
| V1 | PA6 | $N_2$ | 180 | Not foamed | 1140 |
| V2 | PA6 | $N_2$ | 205 | Very lightly foamed, opaque | 700 |
| V3 | PA6 | $N_2$ | 210 | Overfoamed, hollow structure no particle retention | — |

In the temperature range of 210-250° C., in which the PA 6/6.36 is processed in the extruder, viscosity is virtually constant. This leads to a more stable particle foam. In the case of PA 6, by contrast, viscosity falls significantly within the temperature range mentioned.

The invention claimed is:
1. Foam particles that have a bulk density below 300 kg/m³ and are based on polyamides, comprising 85% to 100% by weight of at least one copolyamide obtained by polymerizing the following components:
(A) 15% to 84% by weight of at least one lactam, and
(B) 16% to 85% by weight of a monomer mixture (M) comprising the following components:

(B1) at least one $C_{32}$-$C_{40}$ dimer acid, and
(B2) at least one $C_4$-$C_{12}$ diamine,
wherein the monomer mixture (M) comprises in the range from 45 to 55 mol % of component (B1) and in the range from 45 to 55 mol % of component (B2), based on the total molar amount of the monomer mixture (M), and the sum total of the components of (A) and (B) is 100% by weight.

2. Foam particles according to claim 1, which consist of 85% to 100% by weight of the at least one copolyamide and 0% to 15% by weight of additives.

3. Foam particles according to claim 1, which have a bulk density in the range of 30-250 kg/m³.

4. Foam particles according to claim 1, wherein component (A) is selected from the group consisting of 3-aminopropanolactam, 4-aminobutanolactam, 5-aminopentanolactam, 6-aminohexanolactam, 7-aminoheptanolactam, 8-aminooctanolactam, 9-aminononanolactam, 10-aminodecanolactam, 11-aminoundecanolactam, and 12-aminododecanolactam.

5. Foam particles according to claim 1, wherein component (B2) is selected from the group consisting of tetramethylenediamine, pentamethylenediamine, hexamethylenediamine, decamethylenediamine, and dodecamethylenediamine.

6. Foam particles according to claim 1, wherein the at least one copolyamide has a glass transition temperature ($T_g$) in the range from 20 to 50° C., determined according to ISO 11357-2:2014.

7. Foam particles according to claim 1, wherein the at least one copolyamide has a melting temperature ($T_m$) in the range from 150 to 210° C., determined according to ISO 11357-2:2014.

8. A process for producing foam particles according to claim 1, the process comprising the stages of:
(a) providing a polymer or polymer mixture comprising 85% to 100% by weight of at least one copolyamide, obtained by polymerizing the following components:
(A) 15% to 84% by weight of at least one lactam, and
(B) 16% to 85% by weight of a monomer mixture (M) comprising the following components:
(B1) at least one $C_{32}$-$C_{40}$ dimer acid, and
(B2) at least one $C_4$-$C_{12}$ diamine,
wherein the monomer mixture (M) comprises in the range from 45 to 55 mol % of component (B1) and in the range from 45 to 55 mol % of component (B2), based on the total molar amount of the monomer mixture (M), and the sum total of the components of (A) and (B) is 100% by weight;
(b) impregnating the polymer or polymer mixture with carbon dioxide, nitrogen or mixtures thereof as blowing agent to form a blowing agent-containing polymer or polymer mixture; and
(c) expanding the blowing agent-containing polymer or polymer mixture under foaming to give foam particles.

9. The process according to claim 8, wherein, in stage (b), the polymer or polymer mixture which is impregnated with carbon dioxide, nitrogen, or mixtures thereof as blowing agent, is in the form of pellets, and the carbon dioxide, nitrogen, or mixtures thereof as blowing agent is/are gaseous, and the impregnating of the pellets with the gaseous carbon dioxide, nitrogen, or mixtures thereof as blowing agent, occurs in an autoclave at a pressure in the range of 18 to 25 MPa at a temperature in the range from 180 to 250° C. for 1 to 5 hours.

10. The process according to claim 8, wherein, in stage (b), the polymer or polymer mixture is melted and the melted polymer or polymer mixture is impregnated with carbon dioxide, nitrogen or mixtures thereof.

11. A process for producing foam particles according to claim 1, the process comprising the steps of:
(a) providing a polymer or polymer mixture comprising 85% to 100% by weight of at least one copolyamide, obtainable obtained by polymerizing the following components:
(A) 15% to 84% by weight of at least one lactam, and
(B) 16% to 85% by weight of a monomer mixture (M) comprising the following components:
(B1) at least one $C_{32}$-$C_{40}$ dimer acid, and
(B2) at least one $C_4$-$C_{12}$ diamine,
wherein the monomer mixture (M) comprises in the range from 45 to 55 mol % of component (B1) and in the range from 45 to 55 mol % of component (B2), based on the total molar amount of the monomer mixture (M), and the sum total of the components of (A) and (B) is 100% by weight;
(b) melting the polymer or polymer mixture together with 0% to 1% by weight of a nucleating agent and impregnating by addition of 1% to 3.5% by weight of carbon dioxide, nitrogen or mixtures thereof as blowing agent, based in each case on the polymer or polymer mixture, to form a blowing agent-containing polymer or polymer mixture;
(c) extruding the blowing agent-containing polymer melt through a perforated plate at a temperature between 200° C. and 280° C. into a pelletizing chamber, wherein the blowing agent-containing polymer-melt is pelletized and expanded, thereby forming expanded foam particles; and
(d) discharging the expanded foam particles from the pelletizing chamber, wherein water at a temperature of 5 to 90° C. flows through the pelletizing chamber at a pressure of 0.1 bar to 20 bar above ambient pressure.

12. The process according to claim 8, wherein the at least one copolyamide used has a water content in the range from 0.05% to 1.0% by weight, determined according to DIN EN ISO 15512:2017-03.

13. A method of using the foam particles according to claim 1, the method comprising using the foam particles for production of foam moldings for the automotive industry, wind power industry, building industry, packaging industry, sports and leisure industry, in transport, and/or in construction.

14. The process according to claim 11, wherein the at least one copolyamide used has a water content in the range from 0.05% to 1.0% by weight, determined according to DIN EN ISO 15512:2017-03.

* * * * *